Figure 1:
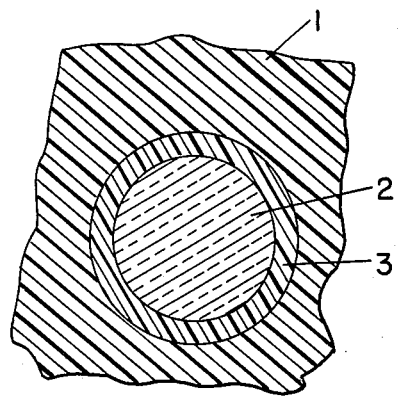

INVENTORS
Otto Wichterle
Drahoslav Lím

2,976,576

PROCESS FOR PRODUCING SHAPED ARTICLES FROM THREE-DIMENSIONAL HYDROPHILIC HIGH POLYMERS

Otto Wichterle, 2 Vaclavkova, Prague XIX, Czechoslovakia, and Drahoslav Lím, 57 Senohraby, near Ricany, Czechoslovakia Filed Apr. 24, 1956, Ser. No. 580,411

11 Claims. (Cl. 18—58)

It is known, that polymerization of monoolefinic monomers, e.g. styrene, with a small amount of a diolefinic monomer, e.g. divinyl benzene, in organic solvent solutions, results in three-dimensional gels (see for instance Staudinger and Heuer, Ber. 67, 1164, 1934, or French patent specifications Nos. 785,940 and 786,984). Hydrogels of this kind were not known hitherto.

The invention relates to new and useful three-dimensional hydrophilic high polymeric articles, which are obtained by polymerizing hydrophilic, water soluble monomers in presence of water or of a water soluble liquid in such a way, that the linear polymeric chains, formed before or being formed during the polymerization, are cross-linked in a three-dimensional hydrophilic net-work, having the appearance of an elastic, soft, transparent hydrogel. Conditions of solubility are maintained during the entire polymerization process or at least during the first stage thereof. If the solubility remains unchanged, the resulting shaped article is homogeneous both physically and optically. If the solubility decreases during the polymerization, then the polymer formed begins to separate from the solution. The product is then microporous, containing innumerable small cavities.

Preferred starting materials include methacrylates of alcohols the chain of which contains hydrophilic groups with such an affinity to water, that the original solubility of the monomers results in sufficient affinity of the polymeric net-work to water.

The monomers which have one double bond are combined with bifunctional or polyfunctional methacrylates which may be obtained by esterifying methacrylic acid with glycols or with compounds having more than two hydroxyl groups. The monomeric methacrylates may also be prepared by transesterification. The polyhydroxylic alcohol for this purpose has to possess further hydrophilic groups, making the compound water soluble even when two or more hydroxylic groups are esterified by methacrylic acid. Methacrylates may be replaced by acrylates, which yield polymeric hydrogels with similar properties.

The combinations of mono-olefinic and di-olefinic monomers may be classified as follows:

(A1) Monofunctional monomers with ionizable hydrophilic groups:

(a) Cationic, e.g. dimethylamino ethyl methacrylate, piperidinoethyl methacrylate, morpholinoethyl methacrylate, formed from dimethylamino ethanol, from piperidino ethanol, and from hydroxyethyl morpholine respectively, (b) Anionic, e.g. methacrylyl glycolic acid or even free methacrylic acid itself.

(A2) Monofunctional monomers with non-ionizable hydrophilic groups: e.g. monomethacrylates of glycols, glycerol and of other polyhydroxylic compounds, monomethacrylates of di- and polyalkylene glycols.

(B1) Polyfunctional monomers with ionizable hydrophilic groups:

(a) Cationic, e.g. triethanolamine dimethacrylate, triethanolamine trimethacrylate, (b) Anionic, e.g. tartaric acid dimethacrylate, (B2) Polyfunctional monomers with non-ionizable hydrophilic groups, such as triethylene glycol dimethacrylate, dimethacrylate of bis-hydroxyethyl acetamide.

By appropriate choice of monomers and particularly of the concentration of aqueous monomer solutions, hydrogels with an unusual range of physical and chemical properties may be obtained. These properties may be further changed by changing the ratio between the monofunctional and bifunctional (or polyfunctional) monomers, particularly as to the shape stability and swelling capacity.

The monomers of the acrylate and methacrylate series form three-dimensional hydrogels, which are highly resistant to chemical agents. The hydrogels not only resist the hydrolytic action of water, which is a normal constituent, but they are also resistant to strong chemical agents, such as hot, fairly concentrated inorganic acids and alkaline lyes. Moreover, they are fully resistant to microorganisms and enzymes.

The colloidal properties, which are often very similar to those of living tissues, make the hydrogel-like shaped articles of this invention very suitable for surgical and prosthetic purposes, whenever an article has to remain in prolonged contact with living tissues or with a mucous membrane.

The selective permeability of these hydrogels to water qualifies them also for various applications involving dialysis. In this respect it is particularly advantageous, that the permeability of these hydrogels may be adapted to any desired purpose, the size and shape of a diaphragm made therefrom being variable at will. The diaphragm may be prepared in situ, to form an integral part of a device. The good chemical stability of the hydrogels also makes them suitable for electrolytic purposes.

The method of forming the hydrophilic articles according to this invention may be modified in such a manner that the dialytic effectiveness is substantially increased. It is possible to form a system of parallel narrow channels or conduits in the diaphragm, which are separated by a comparatively thin layer of the hydrogel. The dialyzed liquids flow either countercurrent or in the same direction through adjacent conduits. The system of conduits in a diaphragm is prepared by placing fibers or sheets made of a subsequently removable substance, in a mold, and then pouring the polymerization mixture. After polymerization, the fibers or sheets are removed by dissolution in an appropriate agent.

A very suitable material for this purpose are glass fibers, which can be removed from the hydrogel-like article by means of hydrofluoric acid. This acid and the silicofluoric acid formed by the reaction are readily soluble and are washed out from the article. Other suitable materials are aliphatic polyesters melting at temperatures below 100° C., which may be melted out, any residue being then removed by means of ethyl acetate.

The arrangement of the channel or conduit system in the diaphragm may be modified for special purposes: e.g. for industrial dialytic processes or for the construction of an artificial kidney. The mentioned examples are only illustrative, without limiting the scope of the invention.

In order to prevent the conduits from bursting during use at points where the fibers touch each other during the forming of the diaphragm, it is preferred to coat the fibers or sheets by immersion in a monomer solution identical or similar to that from which the diaphragm is constructed before the fibers or sheets are placed in the mold, and to cause said solution to polymerize on the surface of the fibers or sheets by moderate heating. The hydrogel-like coating thus obtained is joined during the forming of the diaphragm with the main polymerizate. Several layers of coating may be applied in order to prevent any voids. When this method is employed, the number of conduits in a given volume may be increased without any danger that the fibers will touch each other.

The arrangement described above enables the diaphragm to purify considerable amounts of liquid in a comparatively small space and in a very short time, similarly to the kidney of a living organism. The thickness of the diaphragm between two liquids may be reduced and the hydrogel formed in such a way that it meets specific requirements.

The entire article prepared according to this invention forms a giant swollen molecule. It is therefore not only permeable to water and to aqueous solutions, but also relatively strong, of stable shape and very elastic. It can be boiled in water without being damaged, whereby thorough sterilization may be achieved. These properties make the article suitable for all purposes in surgery, where a body compatible with living tissue or with a mucous membrane is to be used, e.g. for making contact lenses, for filling or dividing cavities in tissue, for pessaries, etc. The new articles are also very suitable as ion exchangers for special purposes.

In some cases it is advantageous to carry out the process of hydrogel formation in such a way, that the polymerizing mass separates into two phases during polymerization. The building of the macromolecular net-work should have proceeded to such an extent that the aqueous phase cannot separate in a continuous layer or in macroscopic bubbles; it separates in very small volumes, forming thus microscopical pores and cavities which are distributed throughout the entire article. When the hydrogel is in a swollen state, the cavities are filled with water or with aqueous solutions. Water is then partially present in capillary pores, partially dissolved, i.e. bound by the hydrophilic radicals of the three-dimensional polymer.

Water may be partly removed from such articles by pressing, but after the pressure has been released, air cannot penetrate into the mass. The article recovers its original shape and size only when in contact with water or another liquid. It possesses thereby some absorbent qualities, which can be utilized e.g. for making adherent pads or layers for dental prostheses and the like.

Shaped absorbent articles of desired properties may be obtained by appropriate choice of starting material, also by addition of a non-solvent for the polymer to the polymerized solution. A suitable starting material is e.g. methyl methacrylate, which, in the monomeric state, is water soluble and may be copolymerized with hydrophilic monomers mentioned above.

The sponge-like articles, formed by porous hydrogels according to the last mentioned variation of this invention, may be used also for ultra-filtration, as prosthetic filling bodies in surgery etc.

*Example 1*

400 parts of polyethyleneglycol methacrylate, obtained by pressing ethylene oxide into a solution of methacrylic acid, are dissolved in 500 parts of water with one part of polyethyleneglycol dimethacrylate. A conventional redox-polymerization catalyst, e.g. sodium bisulfite and ammonium persulfate, is then added and the polymerization is carried out by moderate heating. The moulding thus obtained may be washed in water and used e.g. as a contact lens instead of usual glasses.

*Example 2*

An aqueous solution of monomers is prepared according to Example 1. Two differently colored batches of continuous glass fibers are immersed in the solution in parallel direction and in numerous windings and layers. The fibers were previously coated by the same monomer, which was then polymerized thereon. After polymerization, the diaphragm formed is joined with the ends of the fibers to an inlet and outlet pipe and is treated for several hours with dilute hydrofluoric acid. The diaphragm is then washed in running water.

The attached drawing illustrates the diaphragm produced by this embodiment of the process of the invention in two successive stages of preparation.

Figure 2:
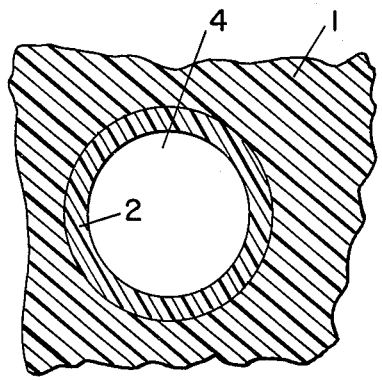

Fig. 1 is a sectional view of a portion of the diaphragm before treatment with hydrofluoric acid, on a greatly enlarged scale, and Fig. 2 is a corresponding view after treatment with hydrofluoric acid.

Referring initially to Fig. 1, there is shown a body 1 of the polymerized mixture of polyethyleneglycol mono- and di-methacrylate having embedded therein a glass fiber 2 which was initially coated with the same mixture which was then polymerized to form a tubular shell 3 before the coated fiber was immersed. For the sake of clarity, the shell 3 is shown as being separate and distinguished from the polymer body 1, but actually, a line of distinction may not be discernible in the finished product.

After removal of the glass fiber by the action of the acid, there is left a corresponding cavity 4 as shown in Fig. 2. The cavity 4 is lined with the material originally forming a coating shell 3 on the glass fiber 2.

*Example 3*

20 parts of triethyleneglycol monomethacrylate, 10 parts of methylmethacrylate and 0.02 part of triethyleneglycol dimethacrylate in 70 parts of water are polymerized with 0.1 part of potassium persulfate at 50° C. The obtained micro-porous, transparent moulding may be used e.g. as a filtration medium.

*Example 4*

20 parts of acrylamide, 20 parts of dimethylaminoethyl methacrylate and 0.1 part of triethanolamine dimethacrylate in 60 parts of water are polymerized with a redox-catalyst (sodium thiosulfate and potassium persulfate). The block of the hydrogel obtained is cut into small pieces, which may be used as ion exchangers.

It is obvious that chemical equivalents of the monomers mentioned in the above specification and examples may be used without exceeding the scope of this invention.

We claim:

1. A method of preparing a sparingly cross-linked polymeric hydrogel structure, comprising mixing in aqueous solution a water-soluble monoester of an olefinic acid selected from the group consisting of acrylic acid and methacrylic acid and of a bifunctional alcohol having an esterifiable hydroxyl group and at least one additional hydrophilic functional group, with a water-soluble diester of an olefinic acid selected from said group and of an alcohol having at least two esterifiable hydroxyl groups, said diester being present in an amount not to exceed one mol percent of said monoester, and causing said mixture to react so as to form a shape-retaining body of a cross-linked copolymer of said monoester and said diester.

2. A method as set forth in claim 1, wherein an elongated insert is immersed in said mixture prior to causing the mixture to react, said body of copolymer is formed about the insert, and the insert is removed so as to form an elongated opening in the body of copolymer.

3. The method as set forth in claim 1, wherein said bifunctional alcohol is a polyalkylene glycol, and said alcohol having two hydroxyl groups is a polyalkylene glycol.

4. The method as set forth in claim 1, wherein said bifunctional alcohol is polyethylene glycol, and said alcohol having two hydroxyl groups is polyethylene glycol.

5. The method as set forth in claim 1, wherein said bifunctional alcohol is triethylene glycol, and said alcohol having two hydroxyl groups is triethylene glycol.

6. The method as set forth in claim 1, wherein said bifunctional alcohol is dimethylaminoethanol, and said alcohol having two hydroxyl groups is triethanolamine.

7. A method of preparing a sparingly cross-linked polymeric hydrogel structure, comprising mixing in aqueous solution a water soluble monoester of an olefinic acid selected from the group consisting of acrylic acid and methacrylic acid and of a bifunctional alcohol having an esterifiable hydroxyl group and at least one additional hydrophilic functional group, with a water-soluble diester of an olefinic acid selected from said group and of an alcohol having at least two esterifiable hydroxyl groups, said diester being present in an amount not to exceed one mol percent of said monoester; immersing an elongated insert in the aqueous mixture so produced; causing said mixture to react so as to form a shape-retaining body of a cross-linked copolymer of said monoester and said diester about said insert, said insert being coated with a coating of said copolymer prior to being immersed in said mixture; and removing said insert so as to form an elongated opening in said body of copolymer.

8. A method as set forth in claim 7, wherein said insert consists of glass and is removed by treating said body with a solution of hydrofluoric acid, and washing said body with water so as to remove the hydrofluoric acid and products of the reaction of said acid with the glass.

9. A method as set forth in claim 7, wherein said insert includes a plurality of elongated members arranged substantially in parallel.

10. A method as set forth in claim 7, wherein said insert consists of a material having a melting point lower than that of said body and lower than the boiling point of water, and is substantially removed from said body by melting out.

11. The method as set forth in claim 10, wherein said material is a low-melting aliphatic polyester.

References Cited in the file of this patent

UNITED STATES PATENTS

| | | |
|---|---|---|
| 2,136,404 | Wheeler | Nov. 15, 1938 |
| 2,266,349 | Wempe | Dec. 16, 1941 |
| 2,426,402 | Magrane | Aug. 26, 1947 |
| 2,628,417 | Peyches | Feb. 17, 1953 |
| 2,636,851 | Juda et al. | Apr. 28, 1953 |
| 2,702,272 | Kasper | Feb. 15, 1955 |
| 2,730,768 | Clarke | Jan. 17, 1956 |
| 2,731,411 | Clarke | Jan. 17, 1956 |